July 3, 1934.    W. HASENBERG    1,965,188
LUMINOUS AMPLIFIER CONTROL
Filed July 7, 1930
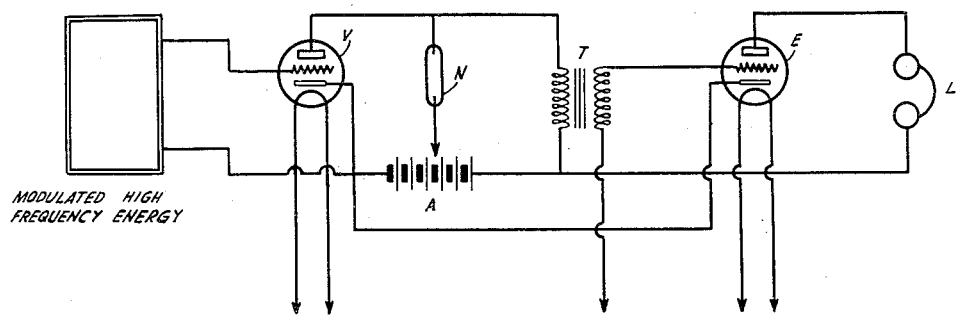
INVENTOR
WERNER HASENBERG
BY
ATTORNEY Patented July 3, 1934

1,965,188

UNITED STATES PATENT OFFICE 1,965,188

LUMINOUS AMPLIFIER CONTROL

Werner Hasenberg, Berlin, Germany, assignor to Telefunken Gesellschaft für Drahtlose Telegraphie m. b. H., Berlin, Germany, a corporation of Germany Application July 7, 1930, Serial No. 465,980
In Germany August 16, 1929

9 Claims. (Cl. 179—171)

My present invention relates to electron discharge tube amplifiers, and more particularly to a method of, and means for, indicating the operation of an amplifier.

The degree of modulation, or the modulation ratios, of an amplifier arrangement can be observed by the aid of a measuring instrument connected in the anode circuit of the last tube. The measuring instruments required therefor are often dispensed with for economical reasons, and are therefore not included in the amplifier. However, to check up on the quality of the reproduction, it is desirable to observe the modulation and to know just when over-modulation occurs.

Now, I have discovered that a gaseous-discharge tube, such as a neon glow-discharge lamp, constitutes a simpler and cheaper manner of indicating whenever the potentials become undesirably high; the lamp being caused to flash up at such potential values.

The novel features which I believe to be characteristic of my invention are set forth in particularity in the appended claims, the invention itself, however, as to both its organization and method of operation will best be understood by reference to the following description taken in connection with the drawing in which I have indicated diagrammatically one circuit arrangement whereby my invention may be carried into effect.

One embodiment of the basic idea of this invention is shown by way of example in the drawing. In parallel relation to the primary winding of the inter-stage transformer connected to the last tube, there is connected a gaseous-discharge lamp in series with a source of direct current. The direct current potential must be kept at such a value that, whenever the potential crest, or maximum potential, considered as admissible arises, the ignition, or flash-over voltage of the discharge lamp is attained.

The flashing of the latter would indicate that the input amplitude of the amplifier must be diminished. But, if the input potential is raised, then the discharge gap resistance becomes very low, and as a result the transformer is damped and the alternating current potential is confined to the modulation range of the tube of the last stage.

By suitably compensating the biasing potential, it is also possible to cause the discharge gap to luminesce and glow upon switching-in the amplifier in the case of indirectly heated input tubes, until the indirectly heated cathode of the input tube is completely emissive. Then, the rupturing potential is reached and by the disappearance of the glow in the discharge gap the working condition of the amplifier is established.

Specifically, in the drawing, V denotes the indirectly heated amplifier tube of the stage preceding the last, E the end, or power tube. The plate potential source is denoted by A, while the gaseous-conduction tube is designated by N. In parallel relation to the latter is the transformer T, while the output circuit of the last tube contains the utilization means as a telephone receiver L. The input circuit of the tube V is connected to a source of modulated energy to be amplified.

While I have indicated and described one arrangement for carrying my invention into effect, it will be apparent to one skilled in the art that my invention is by no means limited to the particular organization shown and described, but that many modifications may be made without departing from the scope of my invention as set forth in the appended claims.

What I claim is:

1. In combination, a source of modulated high frequency energy, an amplifier coupled thereto comprising a pair of electron discharge tubes in cascade, each of said tubes being provided with an anode, grid and cathode, means for heating each cathode to emit electrons, a transformer coupling the output circuit of the first of said tubes to the input circuit of the second one, a source of energy for applying a positive potential to the anode of the first tube, and a gas discharge device connected between the anode of the first tube and a point of less positive potential on said source.

2. In combination, a source of modulated high frequency energy, an amplifier coupled thereto comprising a pair of electron discharge tubes in cascade, each of said tubes being provided with an anode, grid and cathode, means for heating each cathode to emit electrons, a transformer coupling the output circuit of the first of said tubes to the input circuit of the second one, a source of energy for applying a positive potential to the anode of the first tube, and a gas discharge device connected between the anode of the first tube and a point of less positive potential on said source, said device being additionally arranged in shunt with the transformer primary.

3. In combination, a source of modulated high frequency energy, an amplifier coupled thereto comprising a pair of electron discharge tubes in cascade, each of said tubes being provided with an anode, grid and cathode, means for heating each cathode to emit electrons, a transformer coupling the output circuit of the first of said tubes to the input circuit of the second one, a source of energy for applying a positive potential to the anode of the first tube, and a gas discharge device connected between the anode of the first tube and a point of less positive potential on said source, said last mentioned point being such that the discharge potential is not reached until the cathode of said first tube is completely emissive.

4. In combination, in an amplifier, a pair of electron discharge tubes connected in cascade, each tube including a cathode and an anode, a heating filament disposed in at least the first tube for energizing said cathode to emit electrons, a gas discharge indicator connected between the cathode and anode of the first tube, and a source of potential in the anode circuit of the first tube connected to apply a potential to the indicator such that the latter will glow until the cathode of the first tube becomes completely emissive.

5. In combination, in an amplifier, a pair of electron discharge tubes connected in cascade, each tube including a cathode and anode, a heating filament disposed in at least the first tube for energizing said cathode to emit electrons, a gas discharge indicator connected between the cathode and anode of the first tube, and a source of potential in the anode circuit of the first tube connected to apply a potential to the indicator such that the latter will glow until the cathode of the first tube becomes completely emissive, said indicator comprising a neon glow tube.

6. In combination, a source of modulated energy to be amplified, an amplifier coupled thereto comprising a pair of electron discharge tubes in cascade, each of said tubes being provided with an anode, grid and cathode, means for heating each cathode to emit electrons, a transformer coupling the output circuit of the first of said tubes to the input circuit of the second one, a single source of energy for applying a positive potential to the anode of each tube, and a circuit shunting a winding of said transformer, said circuit comprising a gas discharge device connected in series with a portion only of said source of energy.

7. In combination, a source of modulated energy, an amplifier coupled thereto comprising a pair of electron discharge tubes in cascade, each of said tubes being provided with an anode, grid and cathode, means for heating each cathode to emit electrons, a transformer coupling the output circuit of the first of said tubes to the input circuit of the second one, a source of energy for applying a positive potential to the anode of each tube, a gas discharge device arranged in shunt with the transformer primary and means adjustable along said energy source for varying the potential applied to said gas discharge device.

8. An arrangement for indicating overloading in an amplifier of sound modulated alternating current energy, the amplifier comprising a power amplifier tube, a sound reproducer in the output circuit of the power tube, at least one preceding amplifier tube, and a coupling transformer between the output circuit of the preceding amplifier tube and the input circuit of the power amplifier tube, said indicating arrangement including a glow tube, connected in shunt with one of the windings of the transformer, and adapted to glow whenever the energy input to said preceding amplifier tube exceeds a level corresponding to said overload whereby the quality of reproduction of the sound modulation may be visually checked.

9. In combination in a device of the class described, a source of alternating current, an amplifier coupled thereto comprising a pair of electron discharge tubes in cascade, each of said tubes being provided with an anode, grid and cathode, means for heating each cathode to emit electrons, means including an inductance coil coupling the output circuit of the first of said tubes to the input circuit of the second one, a source of energy for applying a positive potential to the anode of the first tube, and a gas discharge device connected between the anode of the first tube and a point of less positive potential on said source.

WERNER HASENBERG.